United States Patent [19]
Doiron

[11] 4,322,065
[45] Mar. 30, 1982

[54] FLY TYER'S VISE

[76] Inventor: Gerald J. Doiron, 27544 Seco Canyon Rd., Saugus, Calif. 91350

[21] Appl. No.: 176,676

[22] Filed: Aug. 11, 1980

[51] Int. Cl.³ .............................................. B25B 1/00
[52] U.S. Cl. ................................ 269/254 R; 269/270; 269/907
[58] Field of Search .............. 269/254 R, 254CS, 239, 269/236, 235, 233, 237, 3, 6, 229, 157, 158, 269, 270, 907; 81/6, DIG. 6; 24/248 R, 248 E, 252 R, 252 B

[56] References Cited

U.S. PATENT DOCUMENTS

| | | | |
|---|---|---|---|
| 90,055 | 5/1869 | Shoemaker et al. | 24/259 R |
| 148,901 | 3/1874 | Smith | 269/254 R |
| 930,235 | 8/1909 | Sanders | 269/157 X |
| 1,545,574 | 7/1925 | Rollins | 269/239 X |
| 2,077,468 | 4/1937 | Fausek et al. | 269/157 X |
| 2,082,653 | 6/1937 | Rawson | 269/270 X |
| 2,569,424 | 9/1951 | Mayhew et al. | 269/239 X |
| 3,353,819 | 11/1967 | Palmer | 269/254 R |
| 3,588,078 | 6/1971 | Van De Sande | 269/6 |

Primary Examiner—Robert C. Watson
Attorney, Agent, or Firm—Charles R. Fay

[57] ABSTRACT

A fly tyer's vise comprising a pair of hardened spring members rigidly adjacent one end of the pair and having a cam operated device for spreading the opposite ends to accept hook, the members including a relatively small transverse slotted member for receiving and holding the hook at the point in front of the barb, the members also holding the hook in the area of the bend thereof, the vise being able to firmly clamp hooks from size 28 to size 1.

1 Claim, 9 Drawing Figures

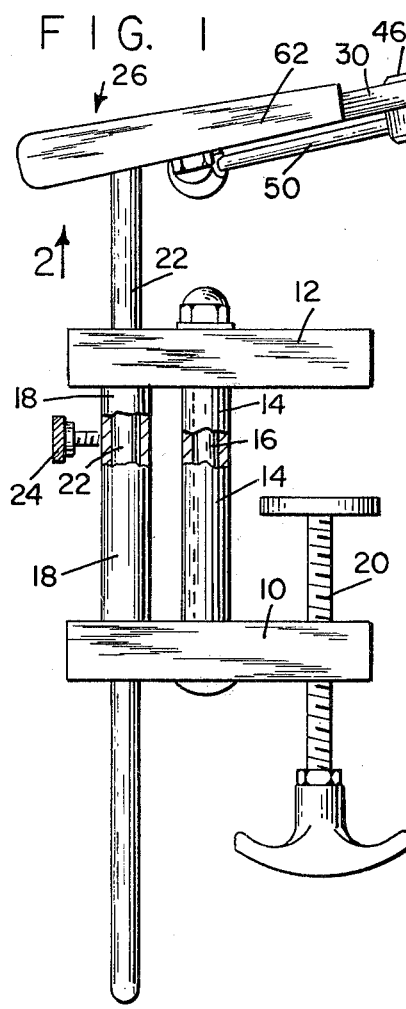
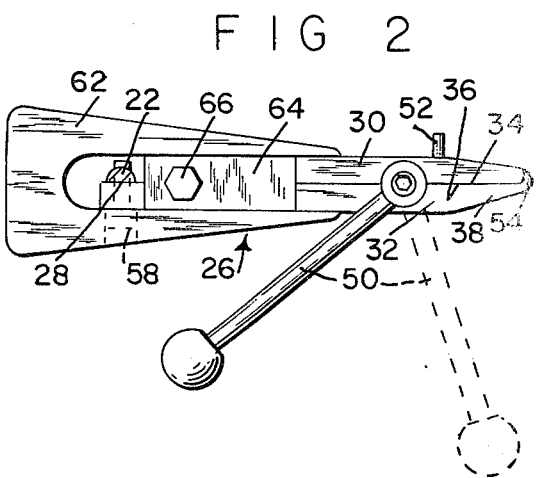
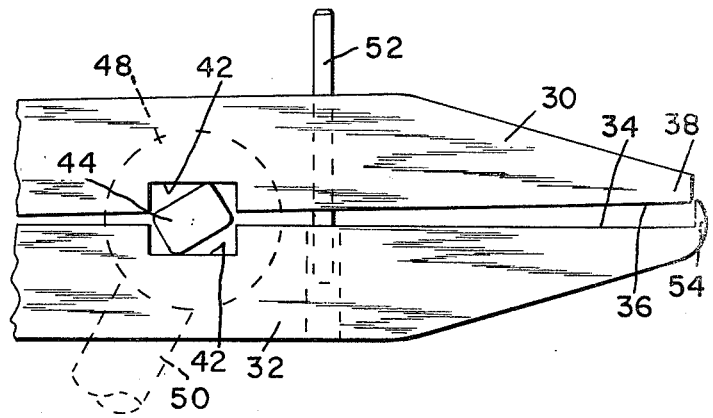
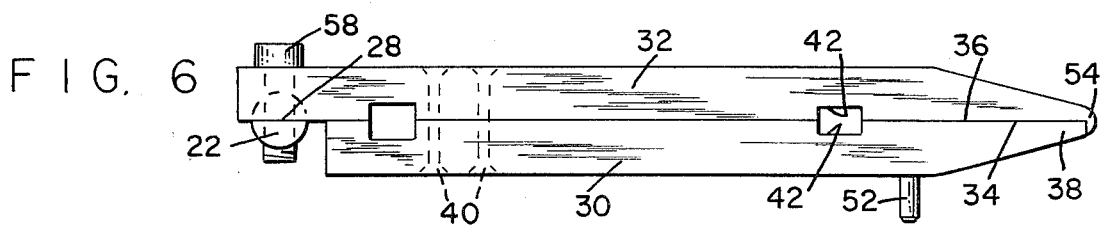
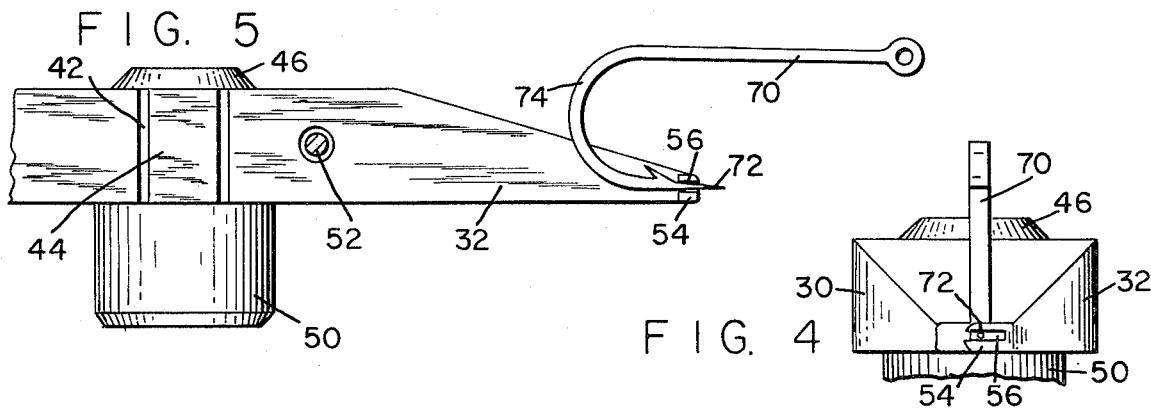

FLY TYER'S VISE

BACKGROUND OF THE INVENTION

There have been many fly tyer's vises suggested, manufactured and used, but as far as applicant is aware they all have one or more deficiencies, particularly in the area of the acceptance of different sizes of hooks, and ease and convenience of adjustment both for this purpose and also in the area of clampling ability and bodily vise adjustment.

It is the principal object of the present invention to provide a new and improved fly tyer's vise which is more versatile in these respects, being adapted to hold hooks of widely varying sizes without any adjustments and to place the clamped hook in the most convenient position for making the fly.

SUMMARY OF THE INVENTION

The present fly tyer's vise comprises a pair of generally parallel bars with means for spacing and holding the same apart, a clamp for attaching the same to a bench, a tube extending between the two bars, said tube being open at both ends and adjustably holding a rod which supports the vise proper.

The vise proper comprises a pair of relatively elongated hardened spring members which are riveted together adjacent corresponding ends and free of each other at the opposite ends. Said members have flat surfaces contacting each other and have to be forced to be spread apart at the free ends, inherently very strong by clamping an object as a fishing hook, at the terminal end portion of the unsecured area of the two spring members.

A cam is used for the purpose of separating the members in order to accept the hook, and one of said members at its extreme end has a laterally extending small tab with a small opening or slot for the acceptance of the point area of the hook in advance of the barb. The bend of the hook is located between the flat surfaces of the spring members and when the cam is released, the members then very strongly clamp by inherent resiliency both the bend of the hook and the point of the hook so that the hook is very rigidly held in two spaced locations.

This enables the vise to accommodate hooks of widely varying sizes, e.g., from a size 1 to a size 24.

BRIEF DESCRIPTION OF THE DRAWINGS

FIG. 1 is a view in elevation illustrating the invention;

FIG. 2 is a bottom plan view of the vise proper looking in the direction of arrow 2 in FIG. 1;

FIG. 3 is a bottom view on an enlarged scale illustrating the clamping ends of the hardened spring members;

FIG. 4 is an end view showing the clamping end of the vise looking in the direction of arrow 4 in FIG. 3;

FIG. 5 is a view in elevation on an enlarged scale looking at the side surface 36 of member 32;

FIG. 6 is a top plan view of the two hardened spring members; and

PREFERRED EMBODIMENT OF THE INVENTION

Figure 7:
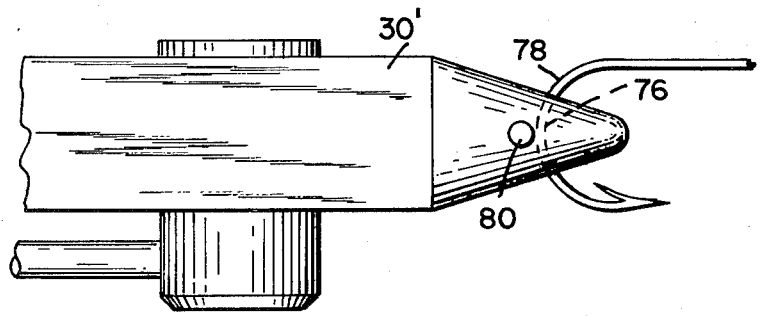
FIGS. 7, 8 and 9 illustrate a modification.

The vise as a whole includes a pair of generally like bars 10 and 12 which may be of any suitable material. A sleeve 14 spaces the bars and an interior bolt 16 holds the bars in fixed relative position. A second sleeve 18 is held between the bars in any suitable manner. Sleeve 18 is located adjacent the corresponding ends of the bars and sleeve 14 is located intermediate the ends of the bars, and as here shown somewhat off center providing a relatively large gap between the bars to accommodate a screw or other type clamp 20 to secure the vise to the edge of a bench or the like.

Sleeve 18 receives a rod 22 rectilinearly and rotatably adjustable therein, the rod being held in selected position by a thumb nut 24 or the like, for adjusting the height of the body of the vise which is generally indicated at 26. At the same time, the vise may be swiveled about 360° for the convenience of the fly tier. The top end portion of the rod 22 is milled off to form a flat 28, FIG. 2.

The vise per se comprises a pair of hardened spring steel members 30 and 32 which have corresponding flat faces 34 and 36, FIG. 3, that contact normally in a tight clamping action, because these spring members while free at the nose end 38 of the pair, are tightly riveted or otherwise connected at their opposite ends, see fasteners 40, FIG. 6. Each spring member 30 and 32 has a notch as at 42, these notches facing and corresponding together forming a recess receiving a cam 44 rigidly attached to or integral with a head 46 and a cam operator 48 which hold the cam in its recess 42 but provide for its rotation on a transverse axis by means of a handle 50 secured to the cam operator 48. A dowel 52 on one member passes through a corresponding opening in the other member. When the cam is swung to press against the bottom areas of the notches 42, the nose portion 38 is slightly opened, and this condition is held as long as the cam is in a past dead center position relative to the notches; but when swung back, the members snap shut making a powerful clamp.

At the termination of its nose portion, spring member 30 is very slightly shorter than the corresponding part of spring member 32. The extra short length of spring member 32 has an inwardly directed short tab 54 that fills in the tip of spring member 38, and has a very small slit 56 in it, FIG. 4. This slit is open ended and terminates approximately at the surface 36.

Spring member 30 is considerably shorter than spring member 32, see FIGS. 2 and 6, and the excess length of spring member 32 abuts the milled flat 28 of rod 22, and a fastener 58, preferably a blind screw, is used to fasten the vise members 30 and 32 to the rod 22 at the top end of the latter in fixed position.

A convenient tapered handle or holder 62 is grooved to receive the spring members and a plate 64 underlying the spring members holds the latter to the handle or holder by a fastener 66 that preferably does not protrude at the upper surface of the handle or holder, and extends through the unindicated square hole adjacent fasteners 40 in FIG. 6.

Upon throwing the lever 50 from e.g. solid line position to dotted line position, FIG. 2, the cam spreads the members 30, 32 to the open position, FIG. 3. The hook 70 is inserted between the members 30, 32, (jaws) with the point 72 in slot 56 of tab 54, the bend 74 of the hook is placed in the jaws, FIG. 5, and the lever 50 turned back past dead center of the cam, whereupon it snaps to locked or clamped position of the spring members. The clamping effect is very great on either a minimal hook or a hook in the range of size 1. The hook cannot turn in any direction, no time consuming adjustment is needed, and rod 22 can be turned to place the hook anywhere most convenient to the fly tier.

Figure 8:
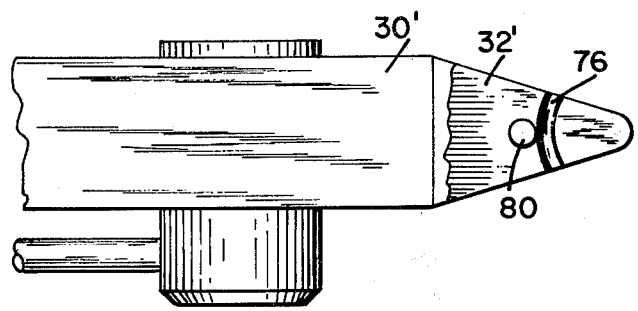
Figure 9:
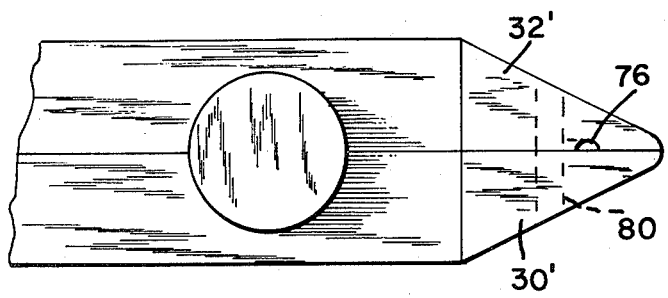

FIGS. 7, 8 and 9 illustrate a modification wherein one jaw, e.g. 32', is provided with a radius groove 76 so that the hook bend 78 can be set into this groove and be clamped by the flat face of jaw 30'. This construction is for extra large hooks.

A pin 80, fast to one jaw and extending into a hole in the other jaw, acts to stop the hook, and position it prior to closing of the jaws; and also this pin keeps the jaws aligned.

I claim:
1. A fly tyer's vise comprising a pair of spring steel jaws, means to hold them in contact, means to separate the jaws, an arc-shaped groove in one jaw only, said groove having a concave portion facing the extreme end of its jaw, and
   including a cross pin on one jaw working in a hole in the other jaw, said cross pin substantially intersecting the convex portion of the groove and acting to back the hook.

* * * * *